Sept. 13, 1949.                A. S. OSBORN                2,481,776
                           RHEOSTAT CONTROL DEVICE Filed June 27, 1945                                3 Sheets-Sheet 2

INVENTOR
ARTHUR S. OSBORN

BY George H. Fisher
        ATTORNEY

Patented Sept. 13, 1949

2,481,776

UNITED STATES PATENT OFFICE 2,481,776

RHEOSTAT CONTROL DEVICE

Arthur S. Osborn, Kansas City, Mo., assignor to Minneapolis-Honeywell Regulator Company, Minneapolis, Minn., a corporation of Delaware Application June 27, 1945, Serial No. 601,813

19 Claims. (Cl. 201—48)

My invention relates generally to manual controlling means used to control the operation of two or more control systems, and more particularly to such controllers that are used to control simultaneously and independently two or more control systems of the electrical type.

In the operation of many different types of equipment, it is often desirable to have such equipment controlled electrically so that the operator need not exert great physical strength to perform the necessary operation. In addition, it is often necessary, as in the case of positioning an object which is movable in two or more directions, to have a single controller which may be used to control two separate systems simultaneously and independently.

Electrical control systems of various types are well known in the art, and the control means for these various systems will take various forms, depending upon the type of system used. In many applications, a rebalancing system using bridge type circuits has been found very satisfactory, and such a system lends itself very well to control by a single controller. The particular type of circuit used with the controller forms no part of my invention, since such circuits are well known in the art and may be of any type suitable for the purpose intended.

In some control systems, particularly in the case where an object is to be positioned in two different planes, it is desirable to have a controller which is movable in two planes parallel to the first planes. Such an arrangement greatly simplifies the job of the operator, since movement of the controller in one direction may be used to cause the object to move in the same direction. When this is desired, the controller may be of a type which is movable in two planes angularly positioned with respect to one another.

Other controllers of this general type have been developed, such as that shown in the application for Letters Patent of Leonard Aske, S. N. 601,815, now Patent No. 2,470,968 issued May 24, 1949, but these controllers have generally had their various elements located so as to require the removal of numerous inspection plates in order to service the controllers properly. With my controller, however, it is only necessary to remove one cover in order to have access to the various control elements, the spring means used to center one of these elements, and the braking means used to restrain the movement of all of the movable members.

It is therefore a major object of my invention to provide a controller which is movable in two planes angularly positioned with respect to one another, and which has all of the parts normally requiring frequent inspection and servicing located so as to be readily accessible by the removal of a single cover.

It is another object of my invention to provide such a controller whose construction permits it to be of smaller dimensions while at the same time possessing all the advantages of a larger sized controller without the greater weight.

It is a further object of my invention to provide a controller in which the movable members may be sealed against the admittance of dust without the use of relatively high cost joints.

It is still another object of my invention to provide a controller which may be relatively inexpensively constructed and in which maintenance and service costs will be reduced to a minimum.

These and other objects of my invention will become apparent from the following description of a preferred form thereof, and from the drawings illustrating that form, in which.

Figures 1, 3, 5:
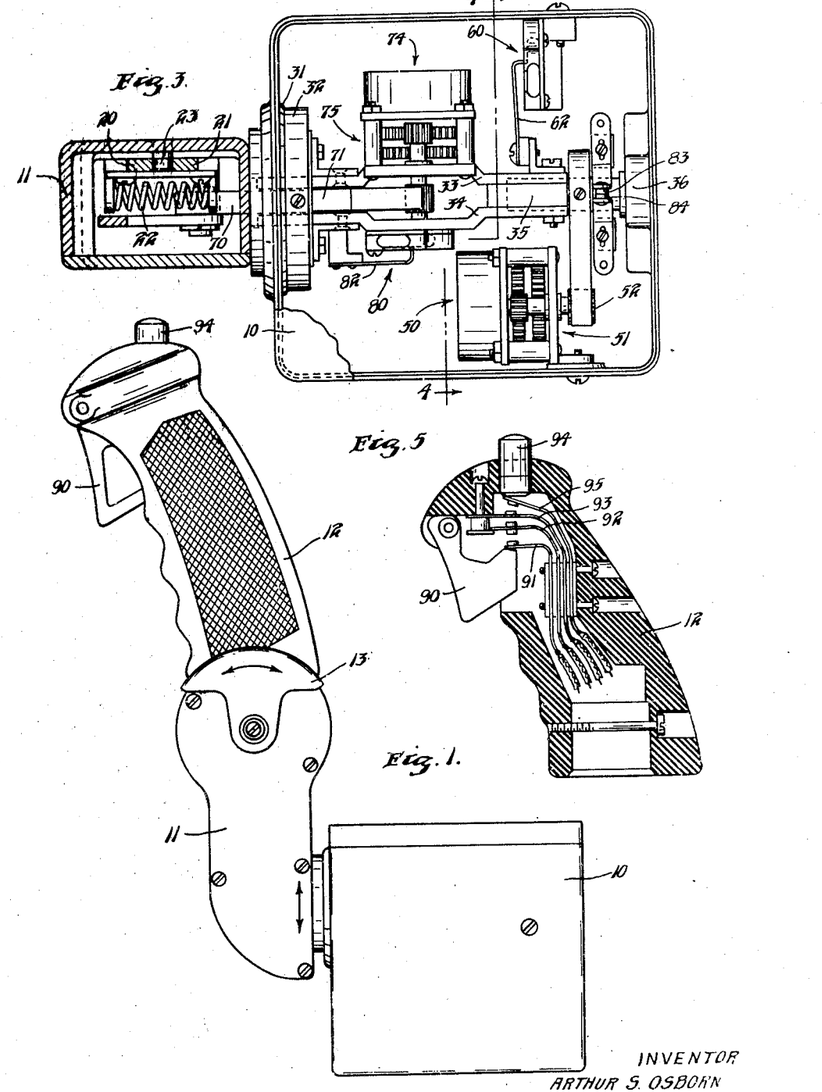
Figure 1 is a side elevational view of my improved controller.
Figure 3 is a view taken at 3—3 in Figure 2 with the top of the housing broken away to show the arrangement of the parts contained therein.
Figure 5 is a cross-sectional view of the handle or grip forming the upper movable member.

Referring now to the drawings and particularly to Figure 1 thereof, it will be seen that the controller may be divided into three general parts, a lower stationary housing 10, a lower movable member 11 pivotally attached to the housing 10, and an upper movable member or hand grip 12 pivotally attached to the lower movable member 11. It will be noted that the lower movable member 11 is pivotally mounted for rotation with respect to the housing 10 about an axis which is horizontal and in the plane of the drawing, and hence the lower movable member is movable in a plane which is perpendicular to the plane of the drawing. Similarly, the grip 12 is pivotally mounted for rotation with respect to the lower movable member 11 about an axis which is horizontal and perpendicular to the plane of the drawing, and hence the grip may be moved with respect to the lower movable member in a plane parallel to the drawing.

The lower end of the grip 12 is provided with a mounting member 13 which is attached to a shaft 14 (Fig. 2) passing through the lower movable member 11. The lower movable member 11 is hollow, and mounted within it on the shaft 14 for rotation therewith is a crank member 15 having a crankpin 16. A centering pin 17 is mounted on the crank member 15 and extends in a direction parallel to the shaft 14. Extending along the length of the lower movable member 11 are a pair of arms 20 and 21, pivotally attached to the lower movable member 11 at points intermediate their ends. The upper ends of the arms 20 and 21 bear against the centering pin 17, and their lower ends are urged apart by a compression spring 22. Since the arms 20 and 21 do not cross but are substantially parallel their entire length, it will be seen that their upper ends will be urged against the centering pin 17. If the crank member 15 is rotated so as to cause the centering pin 17 to move one of the arms, the action of the spring 22 will cause the other arm to attempt to follow the pin. To prevent this resulting or consequential motion of the pivoted arm not moved directly by the centering pin 17, a stop means is provided such as a stop pin 23 rigidly attached to the lower movable member 11.

Figures 2, 4:
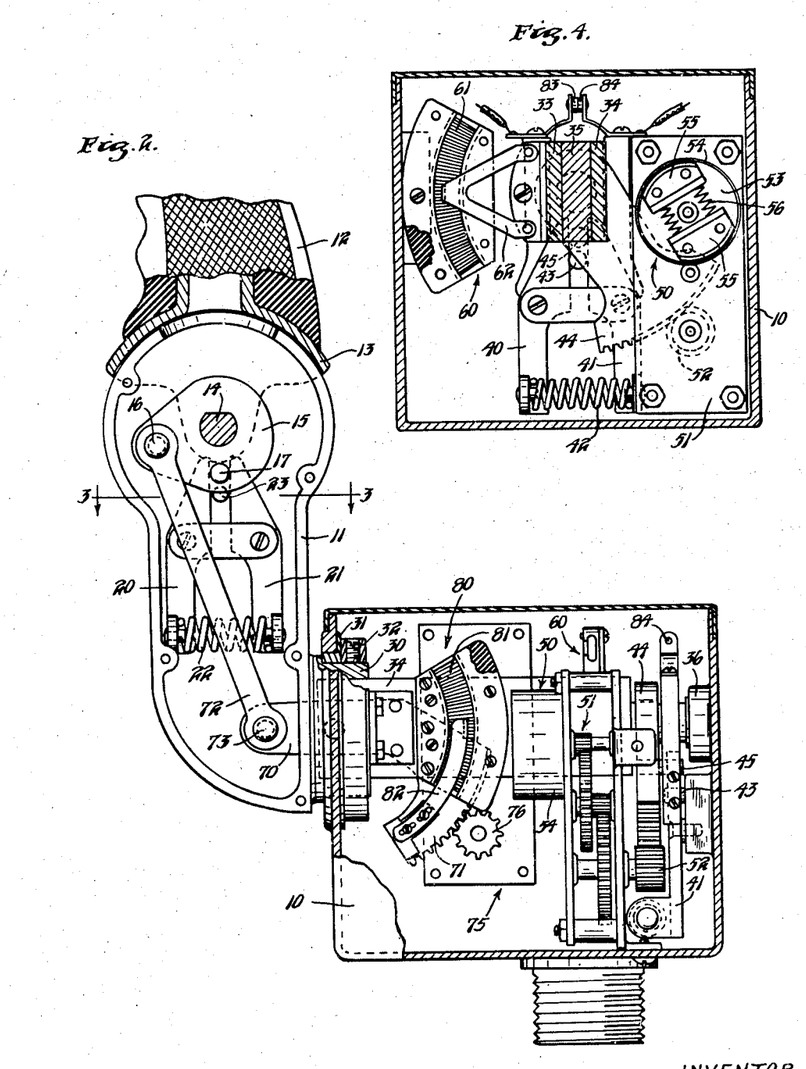
Figure 2 is a side elevational view similar to Figure 1 but with the cover of the lower movable member removed and with the side of the fixed housing cut away to show the arrangement of the parts contained therein.
Figure 4 is a view taken at 4—4 in Figure 3.

If the grip 12 is now moved in the plane of the drawing and to the left, the shaft 14 will be turned counterclockwise and the pin 17 will be forced against the pivoted arm 21, rotating it clockwise about its pivot point and compressing the spring 22. The pivoted arm 20 would, by reason of the urging of the spring 22, likewise tend to rotate in a clockwise direction about its pivot point and follow the centering pin 17, but it is prevented from doing this by the stop pin 23 which holds the pivoted arm 20 against rotation. It will be seen that if the grip 12 is moved in a clockwise direction, the pin 17 will be forced against the pivoted arm 20 and rotate the latter in a counterclockwise direction, while the pivoted arm 21 is held stationary against the stop pin 23, similarly to the action previously described. As a result, the shaft 14 always rotates against the urging of the spring 22 whenever the grip 12 is moved away from the normal or centered position as determined by the centering pin 17, pivoted arms 20 and 21, and stop pin 23. It will thus be seen that I have provided a centering means for the grip 12 which will always tend to return it to a predetermined position with respect to the lower movable member 11.

The lower end of the lower movable member 11 is enlarged to provide a cylindrical portion 30 whose axis is perpendicular to the axis of the shaft 14; and the cylindrical portion 30 is journaled into a bushing 31 mounted in the lower housing 10. A ring 32 is attached to the cylindrical portion 30 on the inside of the lower housing 10 and bears against the inner face of the bushing 31 so that the lower movable member 11 is rotatably mounted in the lower housing 10 but is held against movement into or out of the housing 10. Rigidly connected to the cylindrical portion 30 is a pair of spaced members 33 and 34 (best shown in Figure 3) extending in a direction parallel to the axis of the cylindrical portion and joined at their far ends by a spacer 35 which is journaled into a supporting bearing 36. The spaced members 33 and 34 thus form an extension of the lower movable member 11 and firmly anchor the latter to the fixed housing 10 so that it is held against all movement except rotation in the bushing 31 and bearing 36.

A spring centering means similar to that described in connection with the grip member 12, is used to center the lower movable member 11 with respect to the fixed housing 10. As seen in Figure 4, this centering means consists of a pair of pivoted arms 40 and 41, pivotally attached to the lower housing 10, and extending substantially parallel to each other. A compression spring 42 bears against the lower ends and urges them apart, and a stop pin 43 is rigidly mounted on the lower housing 10 and acts to prevent rotation of one of the arms when the other is moved. A partial gear 44, for a purpose later described, is mounted on the spacer 35 between the spaced members 33 and 34, and the bearing 36. A centering pin 45 is carried by the partial gear 44 and extends between the upper ends of the arms 40 and 41, parallel to the spacer 35. Centering pin 45 bears against the arms and operates them in the same manner as the centering pin 17 previously described. It will thus be seen that a centering means has been provided which will center the lower movable member 11 with respect to the fixed housing 10 in the same manner that the grip 12 is centered with respect to the lower movable member 11.

If the member 11 were rotated with respect then released, the spring 42 would return the lower movable member toward its center position; but because of the momentum of the lower movable member together with the momentum of the grip 12, there would be sufficient energy to carry the movable member 11 past its center position and toward the extreme position on the opposite side. The spring 42 would then urge the lower movable member 11 toward center from that side, with the possibility of the member again traveling past center. This condition of overshooting or hunting is obviously undesirable, and in order to avoid this, I have provided a brake 50 to restrain the movement of the lower movable member 11 and thus prevent this hunting. Since the nature of the brake 50 is such that it must be rotated at a fairly high speed in order to provide an appreciable braking force, the brake is not driven directly by the lower movable member 11, but instead is driven through a gear train 51. The output shaft of the gear train 51 is connected directly to the brake 50, and the input shaft of the gear train is provided with a pinion gear 52 which meshes with and is driven by the partial gear 44 previously mentioned. From the nature of the problem, and from a study of the gear train itself, it will be apparent that the output shaft will turn at a much higher speed than the partial gear 44. The exact ratio of the speed of the output shaft to the speed of the partial gear 44 is not particularly critical, and will depend upon the design of the brake 50 and the anticipated speed of movement of the lower movable member 11; but by way of example only, I have found that in some applications a ratio in the neighborhood of 150 to 1 acts very satisfactorily.

The design of the particular brake used is not particularly critical, since any of various well known forms may be used, but I have found that a centrifugal brake having a disk 53 mounted within a shell 54 for rotation by means of the output shaft of the gear train 51, may carry a pair of slidable weights 55 which are thrown outwardly to bear against the shell 54 to provide a very satisfactory brake. A spring means 56 may be provided to urge the slidable weights 55 together, away from the shell 54, when the disk 53 is at rest. Since the partial gear 44 is connected directly to the spacer 35, any movement of the lower movable member 11 will be transmitted through the gear train 51 to the centrifugal brake 50 and cause the latter to rotate. As a result, there will be a restraining force opposing any movement of the lower movable member 11, whether this is caused by reason of the spring centering means or by the manual control by the operator.

To provide the necessary control elements for the system operated by my controller, I provide a potentiometer 60 consisting of a resistor 61 which has a wiper 62 bearing against it. The resistor 61 is rigidly mounted on the lower housing 10 and the wiper 62 is firmly connected to the spaced member 33 and is therefore rotated by the movement of the lower movable member 11. By a proper adjustment of the wiper 62 and the resistor 61, it is possible to have the wiper located at the midpoint of the resistor when the lower movable member 11 is in its normal or centered position as determined by the spring centering means.

To transmit the movement of the grip 12 into the housing 10, a member 70 is pivotally mounted between the spaced members 33 and 34 within the cylindrical portion 30 of the lower movable member 11. One end of the pivoted member 70 extends into the hollow portion of the lower movable member 11, while the other end extends into the housing 10 and carries a partial gear 71 at the end thereof. A connecting arm 72 extends from the crankpin 16 to the end of the pivoted member 70 which extends into the lower movable member 11, and a pin 73 pivotally connects the connecting arm 72 and the pivoted member 70. It will thus be seen that when the crank member 15 is rotated with the shaft 14, the crankpin 16 will be rotated about the shaft 14 and the connecting arm 72 will transmit this motion through the pin 73 to the pivoted member 70, and the latter will be pivoted about its mounting point.

To prevent the overshooting or hunting of the grip 12 with respect to the lower movable member 11 when the former is suddenly released while in a displaced position, a brake 74, similar to the brake 50, is mounted on the spaced members 33 and 34 so as to move with them. A gear train 75, similar to gear train 51 and having an output shaft directly connected to the centrifugal brake 74 and an input shaft driven by a pinion 76, is likewise mounted on the spaced members 33 and 34 for movement with them. The pinion 76 meshes with and is engaged by the partial gear 71, and hence as the pivoted member 70 is oscillated by the movement of grip 12, the centrifugal brake 74 is rotated at a relatively high speed to provide the desired braking action. The restraint of the brake 74 is transmitted through the gear train 75 to the partial gear 71 and then through the pivoted member 70 and connecting rod 72 to the crank member 15. Any tendency of the spring 22 to cause the crank member 15 to hunt or overshoot is thus continuously opposed by the brake 74; and in actual operation, the grip 12 is centered with respect to the lower movable member 11 without any overshooting whatsoever.

The necessary control impedance consists of a potentiometer 80, likewise mounted on the spaced members 33 and 34 and including a resistor 81 and a wiper 82. The wiper 82 is mounted for movement with the partial gear 71 but is spaced therefrom; and the resistor 81 is firmly mounted on the spaced members 33 and 34. Therefore, as the partial gear 71 is oscillated in response to movement of the grip 12, the wiper 82 will be moved across the resistor 81; and by properly positioning the wiper with respect to the resistor, the wiper may be caused to make contact with the midpoint of the resistor when the grip 12 is in its normal, centered position, as determined by the spring centering means.

Since the operator using this controller will normally have his hand upon the grip 12 at all times, it is very convenient and desirable for him to have a switch incorporated in the grip so that he may operate any intercommunicating equipment which is available to him without having to remove his hand from the grip. For example, if the controller is used to operate the control surfaces of an airplane, the pilot will find it very desirable to be able to operate the interphone equipment of the airplane without removing his hand from the grip. Consequently, as shown in Figure 5, a switch operator 90 is provided which may be operated by the index finger of the pilot.

When the operator 90 is pressed into the grip 12, a pair of switch blades 91 and 92 with their associated contacts are pressed into contact with a third switch blade 93 which is generally at ground potential. The switch blades 91, 92, and 93 may be connected by wires which extend down through the grip 12 into the lower movable member 11 and then into the fixed housing 10 from which they may be run to the interphone equipment and operate the latter, either directly or by means of relays, depending upon the particular system used in the plane.

If both the pilot and co-pilot of a plane are each provided with one of my controllers, it is desirable for them to be able to switch control of the plane from one controller to the other and not to have both controllers operative at the same time. This will usually be done by means of a relay, and to operate this relay, I have shown a push button switch in the top of the grip 12, consisting of a push button 94 which may urge a switch blade 95 against the grounded switch blade 93. Connection may be made to switch blade 95 through the grip 12, in a manner similar to that previously described for the connection to switch blades 91, 92, and 93, and the transfer of control from one controller to another may be secured by a circuit of any suitable type which forms no part of my invention.

Under certain conditions, it may be desirable to have a switch operated when one of the movable members is displaced from its normal or centered position. To provide for this, I have shown a pair of contacts 83 and 84, mounted on the upper ends of the pivoted arms 40 and 41. The contacts 60 and 61 are suitably insulated from the arms, and are positioned so that they normally bear against each other. However, when the lower movable member 11 is displaced from its normal position, one of the arms 40 or 41 is rotated with respect to the other, the contacts 83 and 84 are separated, and their circuit is broken. If a normally open circuit is desired, a relay may be used; or some other well known type of switch may be substituted.

To complete the controller, a separable electrical connector (not shown) of any suitable type may be mounted on the lower housing member 10 for convenience in making connection. Such a connector is not essential in the construction or operation of the controller, but its inclusion aids materially in the installation and servicing of the controller.

Figure 6:
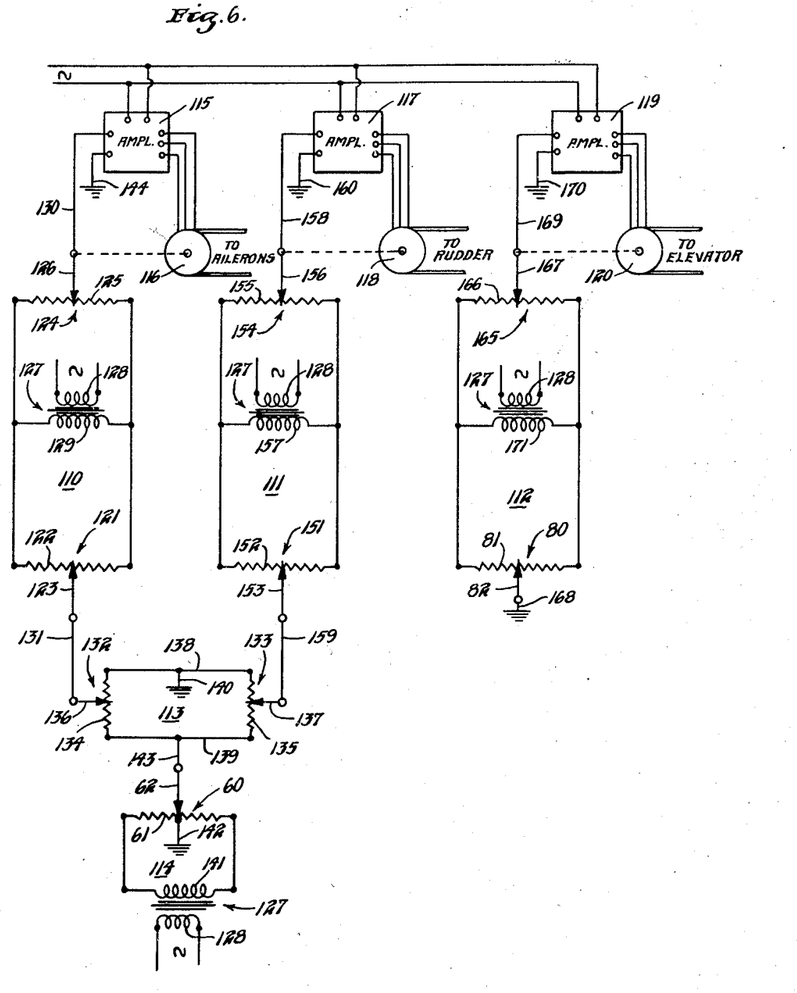
Figure 6 is a schematic wiring diagram of one type of control system which may be used to advantage with my controller.

Description of Figure 6

Considering now the schematic circuit diagram shown in Figure 6, it will be seen that I have provided three bridge systems 110, 111, and 112 to control the ailerons, rudder, and elevator of the airplane, respectively. The aileron bridge 110, and the rudder bridge 111 are connected together through an adjusting network 113, and this is in turn connected to a controlling network 114. One of the output terminals of the aileron bridge 110 is connected to an amplifier 115. The output of the amplifier 115 controls the operation of a servo motor 116 which is connected by cables to the ailerons (not shown) of the airplane and which also operate a rebalancing potentiometer hereinafter described. Similarly, one of the output terminals of the rudder bridge 111 is connected to an amplifier 117 whose output controls the operation of a servo motor 118 which is connected by cables to the rudder (not shown) of the airplane. Likewise, one of the output terminals of the elevator bridge 112 is connected to an amplifier 119 whose output controls a servo motor 120 connected by cables to the elevator (not shown) of the airplane. The bridges and networks are energized by alternating current, and the amplifiers 115, 117, and 119 are of the type which is responsive to a phase reversal of the incoming signal, and which provides an output signal capable of driving a reversing motor in either direction. It is to be understood that I do not claim the design or construction of the amplifiers 115, 117, and 119, and the servo motors 116, 118, and 120 as my invention, since such amplifiers and motors are well known in the art and may be of the type such as shown in the patent to Whitman, No. 1,942,587 or to Anschutz-Kaempfe 1,586,233.

Considering first the aileron bridge 110, it will be seen that this consists of a centering potentiometer 121, having a resistor 122 and a wiper 123, connected in parallel with a rebalancing potentiometer 124, consisting of a resistor 125 and a wiper 126. Power is supplied to the bridge 110 by a transformer 127, having a primary winding 128 which is connnected to a suitable source of power (not shown), and a secondary winding 129 which is connected to the two potentiometers 121 and 124. It will be recognized that this is the well-known Wheatstone bridge, with the wiper 123 and wiper 126 forming the output terminals of the bridge. Wiper 126 is connected by a conductor 130 to one of the input terminals of the aileron amplifier 115, and wiper 123 is connected by conductor 131 to the adjusting network 113.

The adjusting network 113 includes a potentiometer 132 having a resistor 134 and wiper 136, and a potentiometer having a resistor 135 and a wiper 137. Resistors 134 and 135 are connected in parallel by conductors 138 and 139, and conductor 138 is grounded at 140, while conductor 139 is connected to the controlling network 114 by conductor 143.

The controlling network 114 includes the potentiometer 60, located in the housing 10 as previously described, and a transformer 127 having a primary winding 128 and a secondary winding 141 which is connected to the resistor 61 of the potentiometer 60. The midpoint of the resistor 61 is grounded at 142, and as the wiper 62 is moved from one side of the center tap to the other, a voltage which varies in magnitude and reverses in phase will appear between the wiper 62 and ground 142. The voltage thus appearing between the wiper 62 and ground is transmitted by conductor 143 to conductor 139 of the adjusting network 113, and this voltage thus appears across the resistors 134 and 135, where any desired portion of it may be selected by adjusting the position of the wipers 136 and 137. Wiper 136 is connected to conductor 131 so that the portion of the voltage of the control network 114 selected by the position of wiper 136 is applied to the aileron bridge 110. From bridge 110 connection is made by conductor 130 to one of the input terminals of amplifier 115 and the other input terminal is grounded at 144.

A complete voltage circuit for the aileron amplifier 115 may now be traced, starting at ground 142 in control network 114, and continuing through wiper 62 and conductor 143 to the adjusting network 113, through conductor 131 to the aileron bridge 110, from that bridge through conductor 130 to amplifier 115, and from the amplifier through ground 144 and back to ground 142.

Rudder bridge 111 is similar to aileron bridge 110, and includes a centering potentiometer 151, having a resistor 152 and a wiper 153, connected in parallel with a rebalancing potentiometer 154, having a resistor 155 and a wiper 156. A source of power is provided such as a transformer 127 having a primary winding 128 and a secondary winding 157. The secondary winding 157 is connected to the potentiometers 151 and 154, as in the aileron bridge 110, and wiper 156 is connected to one of the input terminals of amplifier 117 through a conductor 158. Similarly, wiper 153 is connected to wiper 137 of the adjusting network 113 by conductor 159 and the other input terminal of amplifier 117 is grounded by conductor 160.

The voltage system for the rudder system will thus be seen to go from ground 142 in the controlling network 114, through wiper 62 and conductor 143 to the adjusting network 113, from there through resistor 135 and wiper 137 to conductor 159 and to bridge 111, from bridge 111 through conductor 158 to amplifier 117, and from there to conductor 160 to ground and back to ground 140.

The control system for the elevator is very simple, and consists of the elevator bridge 112, amplifier 119, and servo motor 120. The bridge 112 includes a rebalancing potentiometer 165, having a resistor 166 and a wiper 167, and the potentiometer 80 which is mounted in the lower housing 10 and has been previously decribed. The resistor 81 of the potentiometer 80 is connected in parallel with the resistor 166 of the potentiometer 165; and wiper 82 of the potentiometer 80 is grounded at 168, while wiper 167 is connected by conductor 169 to one of the input terminals of the elevator amplifier 119, and the other input terminal is grounded by conductor 170. Power is supplied to the bridge 112 by a transformer 127 having a primary winding 128 and a secondary winding 171 which is connected to the resistors 81 and 166 so that the usual Wheatstone bridge results. The voltage circuit may thus be traced from ground 168, through the bridge 112 and conductor 169 to amplifier 119, and then through conductor 170 to ground and back to ground 168.

It is to be noted that the transformer energizing each of the bridges 110, 111, and 112 and the controlling network 114 is the same transformer, having a single primary winding 128, though a separate secondary winding is used for each of the bridges and the networks. The system hereinbefore described requires a number of electrically isolated sources of power, and one of the most convenient ways of securing this is by the use of a transformer having a plurality of secondaries. It will be apparent, of course, that if desired, a plurality of transformers, each having its individual primary and secondary winding, may be used should it be desirable. By using a single transformer, however, the number of transformers is greatly decreased and the cost is therefore materially reduced. The transformer primary 128 and the amplifiers 115, 117, and 119 are energized from the same source of power (not shown) which may, for example, be the airplane's inverter.

While I have shown a circuit in which the control surfaces of the aircraft are positioned by the manual operation of my controller, the latter may also be used to modify the action of a gyroscopically stabilized autopilot. Under the conditions, switch contacts 83 and 84 may be used to control the erecting system of the gyroscope; and such a system is shown in the application of Robert J. Kutzler and Theodore J. Wilson, filed the same day as this.

Operation of Figure 6

If it is now assumed that the airplane is proceeding in straight and level flight, with its control surfaces positioned by the system just described, and it is desired to turn the airplane in azimuth, using the control system shown in Figure 6 to do this, the grip 12 of the controller will be moved to one side so as to cause the wiper 62 to be moved across the resistor 61. When this is done, a voltage will appear between ground 142 and wiper 62, and this voltage will be transmitted by conductor 143 to conductor 139 of adjusting network 113. Conductor 138 of network 113 is grounded, and the voltage appearing between conductor 143 and ground therefore appears between conductors 138 and 139 and is impressed across resistors 134 and 135 of the potentiometers 132 and 133. Any desired portion of this voltage may be selected by adjusting the position of wiper 134, and this portion of the voltage will be transmitted by conductor 131 to aileron network 110, all as previously described.

The voltage appearing between the wipers 123 and 126 of the aileron bridge 110 will be dependent upon the relative position of these two wipers; and if the wipers are at similar positions on their respective resistors 122 and 125, the bridge will be in a condition of balance and there will be no voltage appearing between the wipers. Under normal conditions, the bridge 110 will be balanced when the wiper 62 is in its centered position; and hence in tracing the signal voltage from the controlling network 114, it will be assumed that bridge 110 is balanced at the instant that the voltage from network 114 is first applied to bridge 110.

The voltage appearing between conductor 131 and ground is thus applied to bridge 110, and since there is no difference in potential between wipers 123 and 126, this same voltage appears between conductor 130 and ground and is applied to the input terminals of the amplifier 115. When a voltage is applied to the input terminals of the amplifier 115, the latter energizes the servo motor 116 to cause the latter to drive the ailerons. The servo motor 116 is also connected to the wiper 126 so that as the ailerons are repositioned, the wiper 126 is also moved. This causes a voltage to appear between wipers 123 and 126, and by suitable connection, it is possible to have this voltage oppose that appearing between conductor 131 and ground. As wiper 126 is moved by servo motor 116 from its original position, the voltage appearing between wiper 123 and 126 will increase; and when its value reaches that of the voltage appearing between conductor 131 and ground, these two opposing voltages will cancel each other. Under these conditions, the voltage between conductor 130 and ground, and hence the voltage applied to the input terminals of the amplifier 115, will be reduced to zero. When the voltage applied to the input terminals of the amplifier 115 is reduced to zero, the operation of the servo motor 116 ceases, the ailerons are in a displaced condition corresponding to the position of the wiper 62 on resistor 61, and the servo motor and ailerons remain stationary until some other signal is applied to the amplifier 115.

When the wiper 62 is returned to its center or normal position, conductor 131 is returned to ground potential and the voltage existing between wipers 123 and 126 of the aileron bridge 110 is applied to conductor 130 and the amplifier 115. Since this voltage has a phase opposite to that of the voltage originally applied to the amplifier by the controlling network 114, the amplifier will drive the servo motor 116 in reverse direction, thereby returning the ailerons to streamlined position and simultaneously returning the wiper 126 to a position of balance with respect to wiper 123.

It often happens that because of unequal loading of the plane, one wing thereof will be lower than the other if the ailerons are in streamlined position. If no means were provided to compensate for this, it would be necessary to hold the handle or grip member 12 in a position displaced from center all the time the plane is to be flown in a straight and level flight by means of this control system. This is obviously undesirable, and hence the centering potentiometer 121 is provided so that by displacing the wiper 123 along the resistor 122, the wiper 126 will be correspondingly displaced when the bridge 110 is in balance. This will cause the ailerons to be displaced from center position when the wiper 62 is in its normal position, and the airplane will then fly with its wings level. Since the system shown is a self-balancing system, a balancing effect will take place as rapidly as the wiper 123 is moved; and when the bridge 110 has been balanced, the operation of the network 114 and the adjusting network 113 is the same as that previously described.

The operation of the rudder system is similar in all respects to that of the aileron system just described, the desired portion of the voltage appearing between wiper 62 and ground being selected by the position of the wiper 137 of the potentiometer 133 and transmitted to the rudder bridge 111. Since the bridge 111 is balanced, as previously described in connection with the aileron bridge 110, the voltage appearing between conductor 159 and ground is conducted to the amplifier 117 which in turn causes the operation of the rudder servo motor 118. When the servo motor 118 is operated, the rudder of the airplane is moved and the wiper 156, which is connected to the rudder servo motor 118, is simultaneously moved across the resistor 155 of the potentiometer 154. This causes a balancing voltage to appear between the wipers 153 and 156 which opposes the voltage from the adjusting network 113 and the controlling network 114. When the wiper 62 is returned to center position, the voltage caused by the displacement of the wiper 156 will operate the amplifier 117 to drive the motor 118 in the opposite direction, thereby restoring the balance of the system and returning the rudder to center or streamlined position. The centering potentiometer 151 is for the same purpose and operates in the same manner with respect to the rudder that the centering potentiometer 121 does with respect to the ailerons.

The purpose of the adjusting potentiometers 132 and 133 will now be more readily apparent. In the operation of an airplane, it is generally found that different amounts of aileron and rudder control must be applied in order to secure a coordinated turn, i. e., one in which the airplane neither slips inwardly toward the center of the turn, nor skids outwardly from the center. The amount of rudder movement which is necessary for a given amount of aileron movement to provide a coordinated turn will generally vary from airplane to airplane; and hence it is necessary to provide some sort of an adjusting means so that the control system may be properly set for the individual plane in which it is installed. In the circuits shown, this is provided by the adjusting potentiometers 132 and 133, by means of which the desired amount of voltage appearing between the wiper 62 and ground may be individually selected for both the aileron and rudder circuits. In this way, when the plane is turning in azimuth under the control of the control system, the desired amount of bank may be secured by adjusting the wiper 136 of the potentiometer 132, and the wiper 137 of the potentiometer 133 is then adjusted to provide a coordinated turn.

The elevator circuit shown is very simple, consisting solely of the Wheatstone bridge 112 which has previously been described. The wiper 167 of the rebalancing potentiometer 165 is positioned by the servo motor 120; and thus whenever the servo motor is operated, the wiper 167 is moved until the bridge is balanced. Thus, when the wiper 82 is moved across resistor 81, a voltage appears between wiper 82 and wiper 167; and this voltage is transmitted to the amplifier 119 which then operates the servo motor 120. As the servo motor 120 operates, the position of the elevator is changed and the wiper 167 is simultaneously moved to rebalance the bridge. When the bridge is balanced, the operation of the motor ceases; and when the wiper 82 is then returned to center position, the servo motor is operated in reverse direction to move the wiper 167 to again rebalance the system.

It will thus be seen that the use of this controller provides a control for an airplane which is very similar to that provided by the usual manual controls thereof; but the force required to move the controller will be much smaller than that required to move the control surfaces of the plane by the use of the manual means usually provided, and hence, pilot fatigue will be greatly reduced. It is again repeated that the use of the particular control system shown in Figure 6 is not necessary to the operation of my controller, since many other systems may be used. The system shown herein is by way of example only, and I do not claim the control system shown in Figure 6 as my invention. Furthermore, it is to be understood that the use of my controller is not restricted to controlling the surfaces of aircraft, but may be used wherever a controller of this type is desired.

While I have shown and described a preferred form of my invention, I do not wish to be limited to the particular form or arrangement of parts herein described and shown except as particularly covered by my claims.

I claim as my invention:

1. A controller of the type described which includes: a fixed member; a first movable member pivotally attached to said fixed member for movement in a first plane; a second movable member pivotally attached to said first movable member for movement with respect thereto in a plane at an angle to said first plane; a first variable impedance mounted on said fixed member and controlled by movement of said first movable member about its pivot axis; and a second variable impedance mounted on said fixed member and controlled by the movement of said second member with respect to said first member.

2. A controller of the type described which includes: a housing; a first movable member pivotally attached to said housing for movement in a first plane; a second movable member pivotally attached to said first movable member for movement with respect thereto about an axis and in a plane at an angle to said first plane; means for transmitting the movement of said second movable member with respect to said first movable member into said housing including means mounted in said first member and having a portion rotatable about said axis; a first control member mounted within said housing and controlled by the movement of said first movable member about its pivot axis; and a second control member mounted within said housing for movement with said first movable member, and controlled by said means transmitting the movement of said second movable member with respect to said first movable member.

3. A controller of the type described which includes: a housing; a shaft extending within said housing and mounted for rotation with respect thereto; a first movable member mounted on said shaft for movement with respect to said housing in a first plane; a second movable member pivotally attached to said first movable member for movement with respect thereto in a plane at an angle to said first plane; means transmitting the movement of said second movable member with respect to said first movable member into said housing; a first variable impedance mounted within said housing and controlled by rotation of said shaft; and a second variable impedance mounted on said shaft for rotation therewith within said housing, and controlled by said means transmitting the movement of said second movable member with respect to said first movable member.

4. A controller of the type described which includes: a housing; a first movable member pivotally attached to said housing for movement in a first plane; a second movable member pivotally attached to said first movable member for movement with respect thereto in a plane at an angle to said first plane; a first variable impedance mounted within said housing and controlled by movement of said first movable member about its pivoted axis; a first spring means mounted within said housing and urging said first movable member to a predetermined normal position; a second variable impedance mounted within said housing for movement with said first movable member and operated by movement of said second movable member with respect to said first movable member; and a second spring means mounted within one of said movable members and urging said second movable member to a predetermined normal position with respect to said first movable member.

5. A controller of the type described which includes: a housing; an operating member mounted within said housing for rotation with respect thereto; a first movable member mounted on said operating member for movement in a first plane with respect to said housing; a second movable member pivotally attached to said first movable member for movement with respect thereto in a plane at an angle to said first plane; a first variable impedance mounted within said housing and controlled by the rotation of said operating member; a first spring means mounted within said housing and urging said operating member and said first movable member to a predetermined normal position; a second variable impedance mounted within said housing on said operating member for movement therewith; linkage means transmitting the movement of said second movable member with respect to said first movable member, to said second variable impedance for control of the latter; and a second spring means mounted within said first movable member and urging said second movable member to a predetermined normal position with respect to said first movable member.

6. A controller of the type described which includes: a housing; a first member pivotally attached to said housing for movement in a first plane; a second movable member pivotally attached to said first movable member for movement with respect thereto in a plane at an angle to said first plane; a first restraining means mounted within said housing and yieldably resisting the movement of said first movable member with respect to said housing, said resistance varying with the speed of said movement; a second restraining means mounted within said housing and yieldably resisting the movement of said second movable member with respect to said first movable member, said resistance varying with the speed of said movement; a first variable impedance mounted within said housing and controlled by the movement of said first movable member; and a second variable impedance mounted within said housing and controlled by the action of said second movable member with respect to said first movable member.

7. A controller of the type described which includes: a housing; an operating member mounted within said housing for rotation with respect thereto; a first movable member mounted on said operating member and extending outside of said housing for movement in a first plane with respect to said housing; a second movable member pivotally attached to said first movable member for movement with respect thereto in a plane at an angle to said first plane; a first centrifugal brake mounted within said housing and capable of variably resisting the movement of said first movable member with respect to said housing, said resistance of said brake varying with the speed of movement of the first member; a first variable impedance mounted within said housing and controlled by the movement of said operating member; a second variable impedance mounted within said housing on said operating member for movement therewith; linkage means transmitting the motion of said second movable member with respect to said first movable member, to said second variable impedance for controlling the latter; and a second centrifugal brake mounted within said housing and on said operating member, and resisting the movement of said linkage means.

8. A controller of the type described which includes: a housing; a first movable member pivotally attached to said housing for movement in a first plane; a second movable member pivotally attached to said first movable member for movement with respect thereto in a plane perpendicular to said first plane; a first variable impedance mounted within said housing and controlled by movement of said first movable member about its pivotal axis; a first spring means mounted within said housing and urging said first movable member to a predetermined normal position; a first restraining means mounted within said housing and resisting the movement of said first movable member with respect to said housing; a second variable impedance mounted within said housing for movement with said first movable member and operated by movement of said second movable member with respect to said first movable member; a second restraining means mounted within said housing for movement with said first movable member and resisting the movement of said second movable member with respect to said first movable member; and a second spring means mounted within one of said movable members and urging said second movable member to a predetermined normal position with respect to said first movable member.

9. A controller of the type described which includes: a housing; an operating member mounted within said housing for rotation with respect thereto; a first movable member mounted on said operating member for movement in a first plane with respect to said housing; a second movable member pivotally attached to said first movable member for movement with respect thereto in a plane at an angle to said first plane; a first control device mounted within said housing and controlled by the rotation of said operating member; a first spring means mounted within said housing and urging said operating member and said first movable member to a predetermined normal position; a first centrifugal brake mounted within said housing, and resisting the movement of said first movable member with respect to said housing, said resistance varying with the speed of said movement; a second control device mounted within said housing on said operating member for movement therewith; linkage means transmitting the movement of said second movable member with respect to said first movable member, to said second control device to vary the latter; a second centrifugal brake mounted within said housing and on said operating member, and resisting the movement of said linkage means, said resistance varying with the speed of said movement; and a second spring means mounted within said first movable member and urging said second movable member to a predetermined normal position with respect to said first movable member.

10. A controller of the type described which includes: a fixed member; a first movable member pivotally attached to said fixed member; a second movable member pivotally atached to said first movable member with its pivotal axis at an angle to the pivotal axis of said first movable member; a first spring means urging said first movable member to a predetermined normal position with respect to said fixed member and comprising a pair of pivoted arms connected together at their ends by a spring and adapted to be moved together against the urging of said spring by the movement of said first movable member with respect to said fixed member; a second spring means urging said second movable member to a predetermined normal position with respect to said first member and comprising a pair of pivoted arms connected together at their ends by a spring and adapted to be moved together against the urging of said spring by the movement of said second movable member with respect to said first movable member; a first variable impedance controlled by movement of said first movable member with respect to said fixed member; and a second variable impedance controlled by movement of said second movable member with respect to said first movable member.

11. A controller of the type described which includes: a fixed member; a first movable member pivotally attached to said fixed member; a second movable member pivotally attached to said fixed member with its pivotal axis at an angle to the pivotal axis of said first movable member; a first spring means urging said first movable member to a predetermined normal position with respect to said fixed member and comprising a first pivoted arm, a second pivoted arm normally substantially parallel to said first pivoted arm and laterally displaced therefrom, a spring urging one pair of adjacent ends of said first and second pivoted arms apart and thereby urging the other pair of adjacent ends of said first and second pivoted arms together, means located between said latter ends of said first and second pivoted arms, and acting to move said ends apart against the urging of said spring when said first movable member is moved with respect to said fixed member, and stop means limiting the movement of said arms; a second spring means urging said second movable member to a predetermined normal position with respect to said first movable member and comprising a first pivoted arm, a second pivoted arm normally substantially parallel to said first pivoted arm and laterally displaced therefrom, a spring urging one pair of adjacent ends of said first and second pivoted arms apart and thereby urging the other pair of adjacent ends of said first and second pivoted arms together, means located between said latter ends of said first and second pivoted arms and acting to move said arms apart against the urging of said spring when said second movable member is moved with respect to said first movable member, and stop means limiting the movement of said arms; a first variable impedance controlled by the movement of said first movable member with respect to said fixed member; and a second variable impedance controlled by the movement of said second movable member with respect to said first movable member.

12. A controller of the type described which includes: a housing; a first movable member pivotally attached to said housing for movement in a first plane, said member extending from outside said housing to the inside thereof; a second movable member pivotally attached to said first movable member for movement in a plane at an angle to said first plane; a first control device mounted within said housing and operated by movement of said first movable member with respect to said housing; a second control device mounted within said housing on said first movable member and controlled by movement of said second movable member with respect to said first movable member; a first spring means mounted within said housing and urging said first movable member to a predetermined normal position with respect to said housing and including a first pivoted arm, a second pivoted arm normally substantially parallel to said first pivoted arm and laterally displaced therefrom, a spring urging one pair of adjacent ends of said first and second pivoted arms apart and thereby urging the other pair of adjacent ends of said first and second pivoted arms together, means located between said latter ends of said first and second pivoted arms and acting to move said ends apart against the urging of said spring when said first movable member is moved with respect to said housing, and stop means limiting the movement of said arms; and a second spring means mounted within said first movable member and urging said second movable member to a predetermined normal position with respect to said first movable member and including a first pivoted arm, a second pivoted arm normally substantially parallel to said first pivoted arm and laterally displaced therefrom, a spring urging one pair of adjacent ends of said first and second pivoted arms apart and thereby urging the other pair of adjacent ends of said first and second pivoted arms together, means located between said latter ends of said first and second pivoted arms and acting to move said ends apart against the urging of said spring when said second movable member is moved with respect to said first movable member, and stop means limiting the movement of said arms.

13. A controller of the type described which includes: a housing; a first movable member pivotally attached to said housing and extending from outside said housing to the inside thereof for movement in a first plane; a second movable member pivotally attached to said first movable member for movement in a plane at an angle to said first plane; a first variable impedance mounted within said housing and controlled by movement of said first movable member with respect to said housing; a second variable impedance mounted within said housing on said first movable member for movement therewith; a crank-pin located within said first movable member and moved by pivoting of said second movable member about its axis; a pivoted member mounted on said first movable member and controlling said second variable impedance; and a member connecting said crank-pin and said pivoted member whereby movement of said second movable member will cause movement of said pivoted member and vary said second variable impedance.

14. A controller of the type described which includes: a housing; a first movable member pivotally attached to said housing for movement in a first plane, said member extending from outside said housing to the inside thereof; a second movable member pivotally attached to said first movable member for movement in a plane at an angle to said first plane; a first variable impedance mounted within said housing and operated by movement of said first movable member with respect to said housing; a second variable impedance mounted within said housing on said first movable member and controlled by movement of said second movable member with respect to said first movable member; a first spring means mounted within said housing and urging said first movable member to a predetermined normal position with respect to said housing and including a first pivoted arm, a second pivoted arm normally substantially parallel to said first pivoted arm and laterally displaced therefrom, a spring urging one pair of adjacent ends of said first and second pivoted arms apart and thereby urging the other pair of adjacent ends of said first and second pivoted arms together, means located between said latter ends of said first and second pivoted arms and acting to move said ends apart against the urging of said spring when said first movable member is moved with respect to said housing, and stop means limiting the movement of said arms; and a second spring means mounted within said first movable member and urging said second movable member to a predetermined normal position with respect to said first movable member and including a first pivoted arm, a second pivoted arm normally substantially parallel to said first pivoted arm and laterally displaced therefrom, a spring urging one pair of adjacent ends of said first and second pivoted arms apart and thereby urging the other pair of adjacent ends of said first and second pivoted arms together, means located between said latter ends of said first and second pivoted arms and acting to move said ends apart against the urging of said spring when said second movable member is moved with respect to said first movable members, and stop means limiting the movement of said arms; a crankpin located within said first movable member and moved by pivoting of said second movable member about its axis; a pivoted member mounted on said first movable member and controlling said second variable impedance; and a member connecting said crankpin and said pivoted member whereby movement of said second movable member will cause movement of said pivoted member and vary said second variable impedance.

15. A controller of the type described which includes: a fixed member; a movable member pivotally attached to said fixed member; a spring means urging said movable member to a predetermined normal position with respect to said fixed member and comprising a pair of arms connected together at their ends by a spring and adapted to be moved together against the urging of said spring by the movement of said movable member with respect to said fixed member; and a variable impedance controlled by movement of said movable member with respect to said fixed member.

16. A controller of the class described which includes: a fixed member; a movable member pivotally attached to said fixed member for movement with respect thereto; a spring means urging said movable member to a predetermined normal position with respect to said fixed member and comprising a first pivoted arm, a second pivoted arm normally substantially parallel to said first pivoted arm and laterally displaced therefrom, a spring urging one pair of adjacent ends of said first and second pivoted arm supports and thereby urging the other pair of adjacent arms from said first and second pivoted arms together, means located between said latter ends of said first and second pivoted arms, and acting to move said ends apart against the urging of said spring when said movable member is moved with respect to said fixed member, and stop means limiting the movement of said arm; a centrifugal brake adapted to yieldably resist the movement of said movable member with respect to said fixed member, said resistance varying with the speed of said movement; and a variable impedance controlled by the movement of said movable member with respect to said fixed member.

17. A controller of the type described which includes: a housing; a first movable member pivotally attached to said housing for movement in a first plane; a second movable member pivotally attached to said first movable member for movement in a plane at an angle to said first plane; a first spring means mounted within said housing and urging said first movable member to a predetermined normal position with respect to said housing and comprising a pair of pivoted arms connected together at their ends by a spring and adapted to be moved together against the urging of said spring by the movement of said first movable member with respect to said housing; second spring means mounted within said first movable member and urging said second movable member to a predetermined normal position with respect to said first movable member and comprising a pair of pivoted arms connected together at their ends by a spring and adapted to be moved together against the urging of said spring by the movement of said second movable member with respect to said first movable member; a control device operated by movement of one of said movable members; and a rate limiting device yieldably resisting the movement of said movable member which controls said control device.

18. A controller of the type described which includes: a housing; a first movable member pivotally attached to said housing for movement in a first plane; a second movable member pivotally attached to said first movable member for movement with respect thereto in a plane at an angle to said first plane; a first variable impedance mounted within said housing and controlled by movement of said first movable member about its pivoted axis; a first means mounted within said housing and urging said first movable member to a predetermined normal position; a second variable impedance mounted within said housing for movement with said first movable member and operated by movement of said second movable member with respect to said first movable member; and a second means mounted within one of said movable members and urging said second movable member to a predetermined normal position with respect to said first movable member.

19. A controller of the class described comprising; a base member; a first member pivotally carried by said base member; a controller carried by said base member and adapted to be operated upon movement of said first member; a second member pivotally mounted on said first member about an axis at an angle to the pivotal axis of the first member, said second member being adapted for manual actuation; a second controller carried by said first member; transmission means, including a portion coaxial with said second member and supported by said first member, operatively connecting said second member with said second controller all whereby the transmission means is unoperative on said second controller on operation of said first member but operative on said second controller on movement of said second member with respect to said first member.

ARTHUR S. OSBORN.

(References on following page)

REFERENCES CITED

The following references are of record in the file of this patent:

UNITED STATES PATENTS

| Number | Name | Date |
|---|---|---|
| 539,863 | Faure et al. | May 28, 1895 |
| 640,688 | McGurty | Jan. 2, 1900 |
| 1,427,684 | Grieves | Aug. 29, 1922 |
| 2,219,601 | Orantullo | Oct. 29, 1940 |
| 2,270,866 | Cotesworth et al. | Jan. 27, 1942 |
| 2,270,867 | Cotesworth et al. | Jan. 27, 1942 |
| 2,331,790 | Nichols | Oct. 12, 1943 |
| 2,396,309 | Wodal | Mar. 12, 1946 |

FOREIGN PATENTS

| Number | Country | Date |
|---|---|---|
| 553,559 | Germany | June 27, 1932 |